United States Patent [19]

Novak et al.

[11] 4,261,722

[45] Apr. 14, 1981

[54] METHOD FOR APPLYING AN INORGANIC COATING TO A GLASS SURFACE

[75] Inventors: John H. Novak, Butler; Gary L. Smay, Saxonburg; John S. Wasylyk, Butler, all of Pa.

[73] Assignee: American Glass Research, Inc., Butler, Pa.

[21] Appl. No.: 107,711

[22] Filed: Dec. 27, 1979

Related U.S. Application Data

[63] Continuation of Ser. No. 33,518, Apr. 26, 1979, abandoned.

[51] Int. Cl.$^3$ ............................................. C03C 17/27
[52] U.S. Cl. ................................. 65/60 D; 65/60 R; 427/248.1; 427/315
[58] Field of Search .................. 65/60 R, 60 A, 60 C, 65/60 D; 427/248.1, 315

[56] References Cited

U.S. PATENT DOCUMENTS

| | | | |
|---|---|---|---|
| 3,516,811 | 6/1970 | Gatchet et al. | 65/60 R |
| 3,926,604 | 12/1975 | Smay et al. | 65/60 D |
| 4,188,199 | 2/1980 | Laethem et al. | 65/60 C |

*Primary Examiner*—Arthur D. Kellogg
*Attorney, Agent, or Firm*—Kenyon & Kenyon

[57] ABSTRACT

Inorganic coatings for glass surfaces, especially hot end coatings for glassware, are produced by applying vapors of thermally decomposable metal compounds such as stannic chloride to the surface of glass at an elevated temperature and maintaining in a zone adjacent to and in close proximity to the heated surface a region of elevated moisture content. In a preferred form, separate streams of metal compound vapor and water vapor are directed onto the surface of the heated glass.

16 Claims, No Drawings

METHOD FOR APPLYING AN INORGANIC COATING TO A GLASS SURFACE

This is a continuation of application Ser. No. 033,518 filed April 26, 1979, now abandoned.

This invention relates to a method for forming inorganic coatings on glass surfaces. More particularly, and with specific reference to the glass container industry, this invention is concerned with an improved method for forming an inorganic hot end coating on the surface of a glass container.

BACKGROUND

It has long been known that an inorganic coating can be applied to a glass surface by contacting a hot glass surface with a thermally-decomposable metal compound, whereby the compound, when brought in contact with the hot glass, decomposes to form what is believed to be a metal oxide layer on the surface of the hot glass. Processes of this type were disclosed by Lyle in U.S. Pat. No. 2,375,482 and U.S. Pat. No. 3,353,514.

More recently, processes of this type have been adapted for use in protective coatings for glass containers, particularly beverage bottles and other similar containers. In these processes glass containers, such as glass bottles, while still hot from the bottle-forming equipment and before passage through the annealing lehr, are treated with a thermally-decomposable metal compound, usually stannic chloride, under conditions such that a thin coating is formed on the container surface, which serves to anchor a lubricious organic polymer or wax coating applied to the container surface after they exit from the lehr. This combination of metal oxide "hot end" coating and organic "cold end" coating has been found useful in improving the scratch resistance and lubricity of glass containers. Processes of this type are disclosed, e.g., by Gatchet et al in U.S. Pat. No. 3,516,811.

Although this combined coating has been found useful, current methods of applying hot end coatings have several drawbacks. One of the major methods in commercial use involves applying vapors of the thermally decomposable compound to the hot glass surface. In such a method, it was believed that the metal compound, especially is stannic or titanic chloride is used, must be anhydrous and that dry conditions must be employed throughout. If the metal compound vapors are contacted with moisture, a reaction occurs which leads to the formation of a white solid which can plug vapor lines. In addition, if a halide is employed, such a reaction can lead to the formation of hydrogen halide vapors, e.g., vapors of hydrogen chloride, which are highly corrosive.

Furthermore, in the known procedures it is difficult to ensure formation of a uniform hot end coating because, when the metal compound fumes react with moisture in the atmosphere before contacting the glass surface, non-uniform coating thicknesses and poor bottle-to-bottle reproducibility are obtained. Moreover, the loss of metal halide through such a reaction seriously reduces the efficiency of the use of the expensive metal compound reagent.

Furthermore, in the known processes, only a small portion of the metal compound is actually converted into the inorganic hot end coating; most of the compound passes across the conveyor. Consequently, considerable effort has been made to devise equipment to recapture and recycle the metal compound, as is reflected, e.g., in U.S. Pat. No. 3,688,737 to Augustsson et al. Other efforts to improve coating efficiencies included application of the metal compound in the form of a liquid spray. One such method, employing an aqueous solution of a tin chloride hydrate, is described by Southwick et al in U.S. Pat. No. 3,819,346. Despite this effort, the commercially employed hot end coating procedures still remain relatively inefficient. Recent increases in the cost of the coating agents, especially in the cost of stannic chloride, have given even further impetus to the development of more efficient coating techniques.

DESCRIPTION OF THE INVENTION

It is an object of this invention to provide an improved method for applying an inorganic coating to a glass surface.

It is a further object of this invention to provide an improved method of applying an inorganic hot end coating to glassware, specifically glass containers.

Still another object of this invention is the provision of a highly efficient method for applying an inorganic hot end coating to glass containers, and more specifically glass beverage bottles.

These, and still further objects which will become evident from the ensuing specification and claims, are achieved by directing a stream of a metal compound vapor onto a heated glass surface while forming, in a zone adjacent to and in close proximity to the heated surface, a region of elevated moisture content. It has been unexpectedly and surprisingly found that, if water vapor is present only at or very near the surface of the glass during coating with a vaporized metal compound, exceptionally large increases in coating efficiency are obtained.

As is noted above, when employing vapors of metal compounds to form hot end inorganic coatings, it was believed that anhydrous metal compounds were required, and that dry air was essential throughout, to avoid formation of a reaction product which does not contribute to the hot end coating, and hence actually reduces coating efficiency.

It has been discovered by this invention that the presence of water vapor is detrimental only if the time during which the vaporized metal compound is exposed to moisture is excessive. It has been further found that if separate streams of a metal compound vapor and water vapor are directed to a heated glass surface and are allowed to contact one another only at or very near the heated surface, very substantial increases in the thickness of the inorganic hot end coating, and hence in the efficiency of the coating process, are achieved.

The present invention is applicable to any of the metal compounds which have been employed as anhydrous vapors to form a hot end inorganic coating. The identity of such materials is generally known to the art, and includes inorganic salts, especially halides, and organometallic compounds of metals such as tin and titanium. At present, only stannic chloride and titanium tetrachloride, and to a lesser extent tetraisopropyl titanate, are of commercial importance for use as anhydrous vapors, and accordingly their use in the process of this invention is preferred. Stannic chloride and titanium tetrachloride are more preferred, with stannic chloride being especially preferred.

The vapor stream of the metal compound is formed by known methods, normally by bubbling dry air through anhydrous liquid metal compound. The metal compound vapors are entrained in the air stream for application to the glass surface to be coated. If desired, the gas stream can be diluted with additional air to adjust the concentration of the metal compound vapor in the vapor stream. Although reference has been made only to air as the entraining gas, other inert gases may be employed, such as oxygen, nitrogen, argon and the like. Air is preferred for economic reasons.

As has been taught in connection with prior art processes, the air used as a carrier for the metal compound should be "dry air", i.e., it should have a dew point of less than $-60°$ F., and preferably of less than $-80°$ F. Alternatively, or in addition to the use of dry air, the metal vapor stream can be heated to prevent excessive reaction of the metal compound with moisture in the air stream.

The metal vapor stream is directed onto the glass surface by any convenient method, including various methods known to the art. It is preferred, however, that means be employed to minimize the area of contact of the metal vapor beyond the area to be coated. Thus, when employing the process of this invention to apply the hot end coating of glass to bottles or jars, means should be employed to minimize deposit of a coating on the finish of such containers. Apparatus of this character is disclosed, for example, by Gatchet et al. in U.S. Pat. No. 3,516,811, Scholes in U.S. Pat. No. 3,561,940 and Augustsson et al. in U.S. Pat. No. 3,688,737.

The concentration of metal compound in the vapor stream is not critical to this invention, and concentrations employed in prior art processes, e.g., from about 0.01 to about 2.5 percent by weight of the gas stream, may be employed. However, since the present invention permits thicker coatings to be formed at the same rate of use of metal compound, the concentration of metal compound can be substantially less than that previously employed, and it can be as low as 0.001 weight percent.

Similarly, the rate of application of the metal compound to the glass surface is not critical, provided the rate is sufficient to allow formation of a coating of the desired thickness and uniformity. Again, because of the greater efficiency of the process of this invention, the rate of application can be significantly lower than the rate previously required.

The means by which water vapor is brought into contact with the metal vapor at the glass surface is not a specific feature of this invention, provided it prevents contact of the two vapors for a substantial time prior to contact with the glass surface. For this reason, application of the water vapor stream and the metal vapor stream through nozzles is desired. The water vapor stream is formed in any convenient fashion, as by bubbling air or other inert carrier gas through liquid water. Alternatively, the water vapor stream can be steam, including supersaturated or superheated steam. The amount and rate of application of the water vapor is likewise not a critical feature, provided they are such that improved coating efficiencies are obtained. In general, however, good results are obtained by the use of sufficient water vapor to establish a relative humidity of at least about 55 percent, and preferably at least 75 percent at the plane of the glass surface.

As is noted above, the essential aspect of the present invention is the limitation of the time of contact of metal vapor and water vapor before contact with the glass surface. It has been observed empirically that the efficiency of the coating process decreases rapidly as this time increases. Apparently, the metal compound initially reacts with water to form a reactive intermediate which can either react at the glass surface to form a metal oxide coating, or it can further react to form more stable metal oxide species which are less able to provide a metal oxide coating. It may be speculated that, by minimizing the time of contact of vapor and moisture, the opportunity for the intermediate to form stable metal oxides prior to contact with the hot glass surface is minimized. Regardless of theory, however, it has been found by this invention that short contact times of metal compound and moisture lead to vast increases in coating thickness and efficiency.

The simplest method for limiting this time of contact is to limit the distance between the glass surface and either the outlet from the metal vapor source or the outlet from the water vapor source, or both. As a general rule, this distance should not exceed about 7.5 cm., and preferably should not exceed about 5.0 cm. When employing the process of the present invention to apply a hot end coating to glass containers, this obviously cannot be achieved for the total surface of the container if they are to be coated in an in-line operation while the containers are travelling on a conveyor belt. Nonetheless, useful results are obtained if the distance between the side wall closest to the vapor outlet(s) is not greater than about 2.5 cm.

More uniform coatings are obtained if the bottle or other container is rotated by a suitable means in front of the vapor outlets. Such means have been employed for other operations in the glass container industry, and may be adapted for use in the process of this invention. For example, the container may be removed from the conveyor, placed on a turntable, and the turntable rotated while spraying the metal compound and water vapor onto the surface. After the side wall has been coated, the container can be replaced on the conveyor for further treatment.

The means employed to direct the two vapor streams onto the glass are not critical. In general, however, some form of nozzle is desired, and, of course, separate means for each stream is required. Where nozzles are employed, they may be linearly adjacent one to another, or they may be coaxially arranged. If separate nozzles are employed, it is preferred that they be arranged such that the water vapor stream enters the zone adjacent the glass surface no later than the metal vapor stream. When coaxial nozzles are employed, it is preferred that the metal vapor stream be applied through the central nozzle, while the water vapor stream is applied through an annular nozzle surrounding the metal vapor nozzle.

In practicing the process of this invention, it is essential that the glass being coated be at an elevated temperature. The precise temperature is not critical, provided that it is sufficient to cause the metal compound to form the desired inorganic coating, believed to be a metal oxide. The minimum temperature will vary depending upon the metal compound employed to form the coating. It is a feature of this invention that the minimum temperature in a humid atmosphere is considerably lower than the minimum temperature required in procedures employing totally anhydrous conditions. For example, when employing anhydrous stannic chloride vapors, the glass ordinarily must be at a temperature of at least about 500° C. (900° F.) (See, e.g., U.S. Pat. No. 3,561,940), and when aqueous solutions of stannic chloride pentahydrate are employed, the glass ordinarily must be at a temperature of at least about 370° C. (700° F.) (See, e.g., U.S. Pat. No. 3,819,346). In contrast, effective coatings are obtained with the process of this invention at temperatures as low as about 150° C. (300° F.) or even lower. There is no critical maximum temperature, but the rate of formation of the inorganic coating increases with increasing temperature and, if the formation of thick irridescent coatings is to be avoided, control of the process may be difficult at glass temperatures in excess of about 600° C. to 700° C. In general, the use of temperatures in the range of from about 300° C. to about 650° C. is preferred.

Following practice of the process of this invention, the coated glass may be treated in the same manner as glass which has been coated by prior art procedures. Thus, if the process of this invention is employed to produce a hot end coating for glassware, the thus-coated glassware may then be annealed in a lehr, treated with an inorganic cold end coating, and cooled all in accordance with conventional practice.

The following examples are illustrative:

EXAMPLE 1

Glass plates, approximately 5-cm. square, were heated in air in an electric muffle furnace to a temperature of 630° C., allowed to soak for 20 minutes, removed from the furnace, allowed to cool to a predetermined temperature, and then contacted with tin tetrachloride vapors employing an apparatus which comprised two coaxial tubes having outer diameters of ¼ inch and 1½ inch, respectively. The central tube was employed as the tin tetrachloride tube, while a dry or a moisture-laden gas stream was applied through the annulus between the two tubes. The tin chloride stream was formed by bubbling dry nitrogen (dew point of −100° F.) through a 250 ml. Erhlenmeyer flask containing liquid anhydrous stannic chloride, to form a vapor stream saturated with vaporized stannic chloride. The rate of application was varied from 0.103 to 0.517 ml. of liquid stannic chloride per minute.

A carrier gas stream of dry oxygen or nitrogen gas (dew point of −100° F.) was fed through the annulus between the two tubes at a rate of at least 45 cubic feet per hour, which in a room environment of approximately 55 percent relative humidity, provided a relative humidity of about 38 percent at the surface of the glass. In other experiments, water vapor produced by boiling water in a flask was entrained in the carrier gas by passing the gas through the arms of a "T", the leg of which was connected to the neck of the flask, and the resulting moisture-laden gas stream was fed through the annulus to provide, under the laboratory conditions, a relative humidity at the glass surface of about 78 percent.

Glass slides at temperatures varying from 400°–600° C., were placed perpendicularly in front of the outlet from the tubes, and at distances varying from 2.5 to 5.0 centimeters, and the time of exposure of the glass was varied from 1 to 10 seconds. The slides were then allowed to cool to room temperature, and the thickness of the coating was measured. For thinner coatings, which showed no irridescence, an AGR Hot End Coating Meter was employed, which is capable of measuring tin oxide thicknesses in the range of 0 to approximately 800 Angstroms. The thickness of thicker coatings was estimated from the interference colors observed in reflected white light, in accordance with the method of Kim et al., "Composition and Conductivity of Tin Oxide Film Prepared by Pyrohydrolytic Decomposition of Tin (IV) Compounds," J. Am. Chem. Soc., 58 (1–2), 23–25 (1975).

The results of these experiments are summarized in tabular form as follows:

TABLE I

Soda-lime-silicate Glass[1]

| Experimental Conditions | | | | | Coating Thickness (Å) | |
|---|---|---|---|---|---|---|
| Relative Humidity | Glass Temperature, (°C.) | SnCl$_4$ Flow Rate, (ml./min.) | Glass Exposure Time, (secs.) | Distance (cm.) | Nitrogen Atmosphere | Oxygen Atmosphere |
| 38% | 400 | 0.517 | 1 | 2.5 | 140–160 | 80–120 |
| | | 0.310 | 5 | 2.5 | 400–520 | 320–400 |
| | | 0.517 | 10 | 2.5 | 1250 | 1250 |
| | 500 | 0.103 | 3 | 2.5 | 120–240 | 80–120 |
| | | 0.517 | 1 | 2.5 | 400–600 | 320–400 |
| | | 0.517 | 5 | 2.5 | 1250 | 1250 |
| | 600 | 0.103 | 2 | 2.5 | 100–200 | 100–200 |
| | | 0.310 | 1 | 2.5 | 400–640 | 400–520 |
| | | 0.310 | 3 | 2.5 | 1250 | 1250 |
| 78% | 400 | 0.103 | 2 | 5.0 | 120–140 | 80–120 |
| | | 0.103 | 4 | 5.0 | 380–420 | 320–400 |
| | | 0.103 | 5 | 2.5 | 1250 | 1250 |
| | 500 | 0.103 | 2 | 5.0 | 100–140 | 100–120 |
| | | 0.103 | 2 | 2.5 | 400–600 | 400–600 |
| | | 0.103 | 5 | 2.5 | 1250 | 1250 |
| | 600 | 0.103 | 2 | 5.0 | 120–200 | 120–200 |
| | | 0.103 | 1 | 2.5 | 400–600 | 400–500 |
| | | 0.103 | 3 | 2.5 | 1250 | 1250 |

[1] 12.8% Na$_2$O, 0.44% MgO, 1.83% Al$_2$O$_3$, 78.27% SiO$_2$, 0.36% K$_2$O, 6.99% CaO, 0.062% Fe$_2$O$_3$.

TABLE II

Fused Silica and Borosilicate Glass
(Nitrogen Atmosphere Only)

| Experimental Conditions | | | | | Coating Thickness (Å) | |
|---|---|---|---|---|---|---|
| Relative Humidity | Glass Temperature, (°C.) | SnCl$_4$ Flow Rate, (ml./min.) | Glass Exposure Time, (secs.) | Distance, (cm.) | Fused Silica[2] | Borosilicate[3] |
| 38% | 400 | 0.517 | 1 | 2.5 | 100–140 | 80–180 |
|  |  | 0.310 | 5 | 2.5 | 400–520 | 400–600 |
|  |  | 0.517 | 10 | 2.5 | 1250 | 1250 |
|  | 500 | 0.103 | 3 | 2.5 | 120–200 | 120–200 |
|  |  | 0.517 | 1 | 2.5 | 360–400 | 400–600 |
|  |  | 0.517 | 5 | 2.5 | 1250 | 1100 |
|  | 600 | 0.103 | 2 | 2.5 | 80–200 | 120–200 |
|  |  | 0.310 | 1 | 2.5 | 400–440 | 400–600 |
|  |  | 0.310 | 3 | 2.5 | 1250 | 1250 |
| 78% | 400 | 0.103 | 2.5 | 5.0 | 80–140 | 140–220 |
|  |  | 0.103 | 5 | 5.0 | 400–520 | 400–440 |
|  |  | 0.103 | 5 | 2.5 | 1250 | 1200 |
|  | 500 | 0.103 | 2.5 | 5.0 | 100–140 | 100–140 |
|  |  | 0.103 | 2.5 | 2.5 | 400–600 | 400–600 |
|  |  | 0.103 | 5 | 2.5 | 1250 | 1250 |
|  | 600 | 0.103 | 2.5 | 5.0 | 160–220 | 120–220 |
|  |  | 0.103 | 1 | 2.5 | 400–600 | 400–520 |
|  |  | 0.103 | 3 | 2.5 | 1200 | 1250 |

[2] 100% SiO$_2$.
[3] 3.8% Na$_2$O, 2.2% Al$_2$O$_3$, 80.5% SiO$_2$, 0.40% K$_2$O, 12.9% B$_2$O$_3$, 0.2% Li$_2$O.

EXAMPLE 2

Employing procedures similar to those described in Example 1, soda-lime-silicate glass slides were coated at temperatures varying from 200° to 600° C., using nitrogen as the carrier gas. The results of these experiments are as follows:

| Glass Temperature, (°C.) | SnCl$_4$ Flow Rate, (ml./min) | Glass Exposure Time, (secs.) | Distance, (cm.) | Coating Thickness (Å) 38% RH | 78% RH |
|---|---|---|---|---|---|
| 600 | 0.310 | 5 | 2.5 | 1250 | 11500 |
| 500 | 0.310 | 5 | 2.5 | 750 | 8700 |
| 400 | 0.310 | 5 | 2.5 | 440 | 2200 |
| 300 | 0.310 | 5 | 2.5 | 60 | 600 |
| 200 | 0.310 | 5 | 2.5 | 0 | 200 |
| 600 | 0.103 | 3 | 2.5 | 260–320 | 1500 |
| 500 | 0.103 | 3 | 2.5 | 220 | 750 |
| 400 | 0.103 | 3 | 2.5 | 160 | 750 |

EXAMPLE 3

Using the coaxial applicator described in Example 1, coatings were formed on the side wall of stationary soda-lime glass bottles heated at temperatures of from about 100° C. to 600° C. Live steam formed by bubbling nitrogen through boiling water was substituted for the water vapor saturated carrier gas stream. The distance from the nozzle outlet was varied from 1.25 cm. to 5 cm., and the time of exposure was 2 seconds. The maximum thickness of the coating (which generally was at the midside wall), was measured. The results are summarized as follows:

| Coating Temp., °C. | Coating Thickness (Å) | | | | | |
|---|---|---|---|---|---|---|
|  | 1.25 cm. | | 2.5 cm. | | 5 cm. | |
|  | Low RH | High RH | Low RH | High RH | Low RH | High RH |
| 100 | 0 | 0 | — | — | 0 | 0 |
| 200 | 0 | 0 | 0 | — | 0 | 0 |
| 300 | 120 | 440 | 50 | 175 | 0 | 100 |
| 400 | 180 | 1000 | 310 | 645 | 120 | 180 |
| 500 | 650 | 3750 | 650 | 750 | 650 | 160 |
| 600 | 1400 | 3750 | 1400 | 750 | 650 | 160 |

It is evident from the foregoing that, provided the distance between the glass surface and the nozzle outlet is small (below about 2.5 cm.), the use of a vapor stream materially increases the coating thickness. When the distance exceeds this limit, no improvement is observed and, indeed, with increasing distances the coating thickness decreases.

EXAMPLE 4

The procedures of Example 3 were repeated, except that titanium tetrachloride was substituted for stannic chloride. The results of these experiments are summarized as follows:

| Coating Temp., °C. | Coating Thickness (Å) | | | | | |
|---|---|---|---|---|---|---|
|  | 1.25 cm. | | 2.5 cm. | | 5 cm. | |
|  | Low RH | High RH | Low RH | High RH | Low RH | High RH |
| 100 | — | — | 320 | 400 | 320 | 0 |
| 200 | — | 2300 | 500 | 400 | 600 | 0 |
| 300 | 800 | 2050 | 700 | 770 | 600 | 0 |
| 400 | 1350 | 2300 | 750 | 740 | 700 | 0 |
| 500 | 1350 | 2300 | 800 | 575 | 750 | 0 |

-continued

| Coating Temp., °C. | Coating Thickness (Å) | | | | | |
|---|---|---|---|---|---|---|
| | 1.25 cm. | | 2.5 cm. | | 5 cm. | |
| | Low RH | High RH | Low RH | High RH | Low RH | High RH |
| 600 | 1800 | 2300 | 1150 | 650 | 800 | 0 |

It will be noted that the results obtained with titanium tetrachloride generally parallel those reported for stannic chloride in Example 3, the major difference being the ability to form a coating at lower temperatures with titanium tetrachloride and a much more sensitive distance effect in humid atmospheres.

What is claimed is:

1. In a method for forming an inorganic coating on the surface of glass by directing onto said surface at an elevated temperature, a gas stream containing a vapor of a metal compound which is thermally decomposable to form said inorganic coating, the improvement of establishing in a zone in close proximity to said surface a relative humidity of at least about 55 percent, sufficient to increase the rate of formation of said metal oxide on said surface.

2. A method according to claim 1 wherein said increase in relative humidity is achieved by directing onto said surface a gas stream including water vapor, which stream is separate from said stream containing a vapor of said metal compound.

3. A method according to claim 1 wherein said metal compound is tin tetrachloride, titanium tetrachloride or tetraisopropyl titanate.

4. A method according to claim 1 wherein said metal compound is tin tetrachloride.

5. A method according to claim 1 wherein said gas stream including water vapor is steam.

6. A method according to claim 1 wherein said zone has a thickness not greater than about 7.5 cm.

7. A method according to claim 6 wherein said thickness is not greater than about 5.0 cm.

8. A method according to claim 1 wherein the temperature of said glass is from about 100° C. to about 700° C.

9. A method according to claim 8 wherein said temperature is from about 300° C. to about 650° C.

10. In a method for applying an inorganic coating to glassware by contacting glassware at an elevated temperature with a thermally decomposable compound, the improvement of directing onto the surface of said glassware a stream of a vapor of said thermally decomposable compound and a separate stream of steam, wherein said streams are not permitted to contact one another until they are in a zone in close proximity to the surface of said glassware.

11. A method according to claim 10 wherein said metal compound is tin tetrachloride, titanium tetrachloride or tetraisopropyl titanate.

12. A method according to claim 11 wherein said glassware is transported on a conveyor past an application station including nozzles for application of said metal compound and said water vapor, and the distance from the side wall of the glassware closest to the nozzles does not exceed about 2.5 cm.

13. A method according to claim 12 wherein said metal compound is tin tetrachloride.

14. A method according to claim 11 wherein said glassware is rotated adjacent to nozzles for application of said metal compound and said water vapor, and the distance from said glassware to said nozzles does not exceed about 7.0 cm.

15. A method according to claim 14 wherein said distance does not exceed about 5 cm.

16. A method according to claim 14 wherein said method does not exceed about 2.5 cm.

* * * * *

UNITED STATES PATENT AND TRADEMARK OFFICE
CERTIFICATE OF CORRECTION

PATENT NO. : 4,261,722
DATED : April 14, 1981
INVENTOR(S) : Novak et al.

It is certified that error appears in the above—identified patent and that said Letters Patent is hereby corrected as shown below:

Column 10, Line 41, change "method" to --distance--.

Signed and Sealed this

Twenty-third Day of June 1981

[SEAL]

Attest:

RENE D. TEGTMEYER

Attesting Officer     Acting Commissioner of Patents and Trademarks